UNITED STATES PATENT OFFICE.

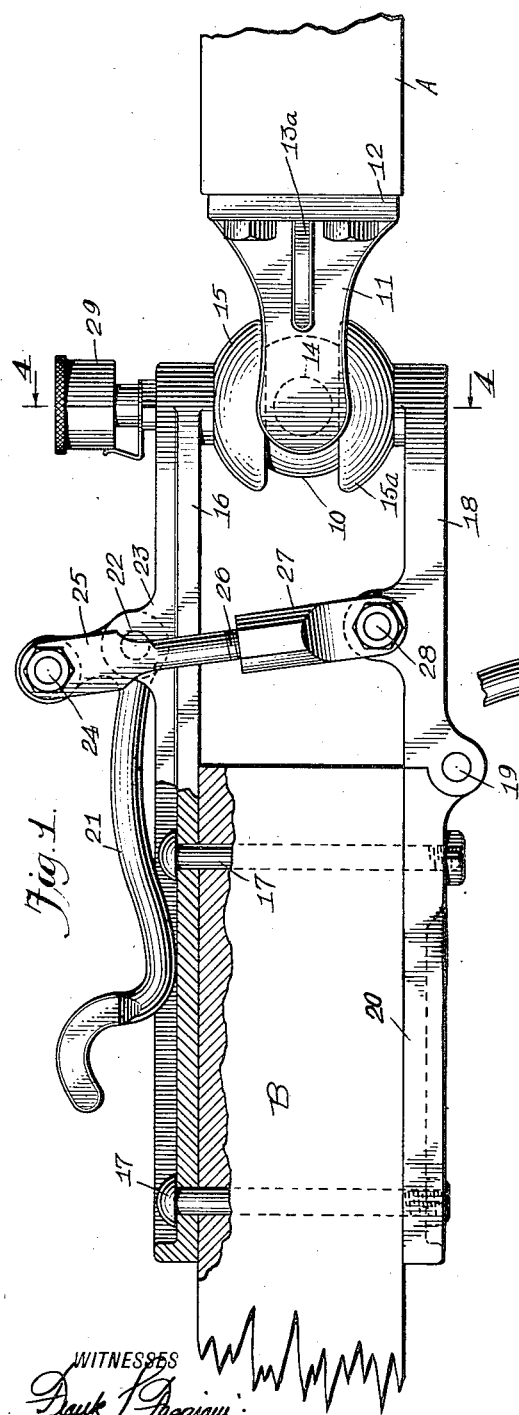
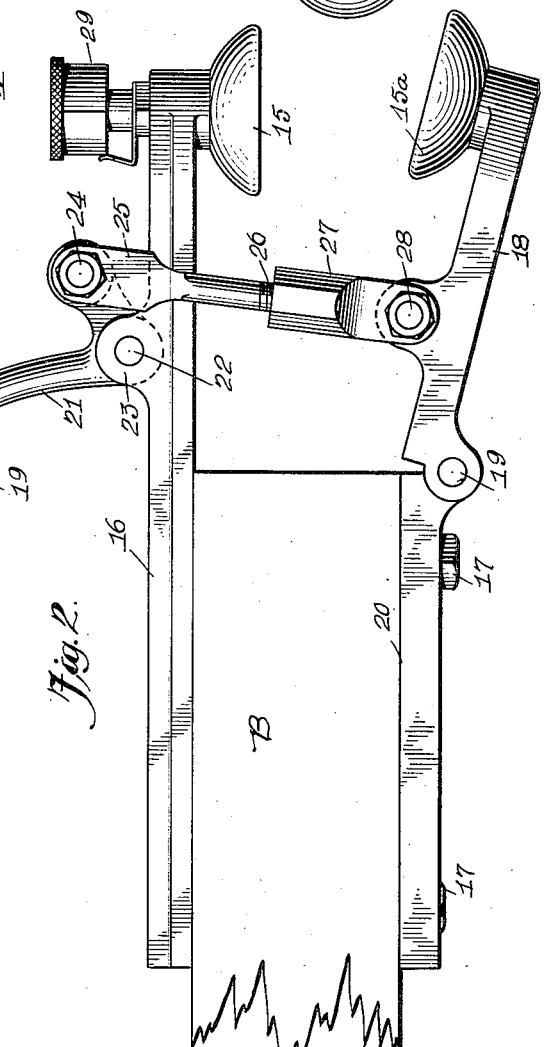
J. W. BULLER.
TRUCK AND TRAILER COUPLING.
APPLICATION FILED SEPT. 17, 1920.
1,401,873. Patented Dec. 27, 1921.
2 SHEETS—SHEET 1.
INVENTOR
JACOB W. BULLER
BY
ATTORNEYS

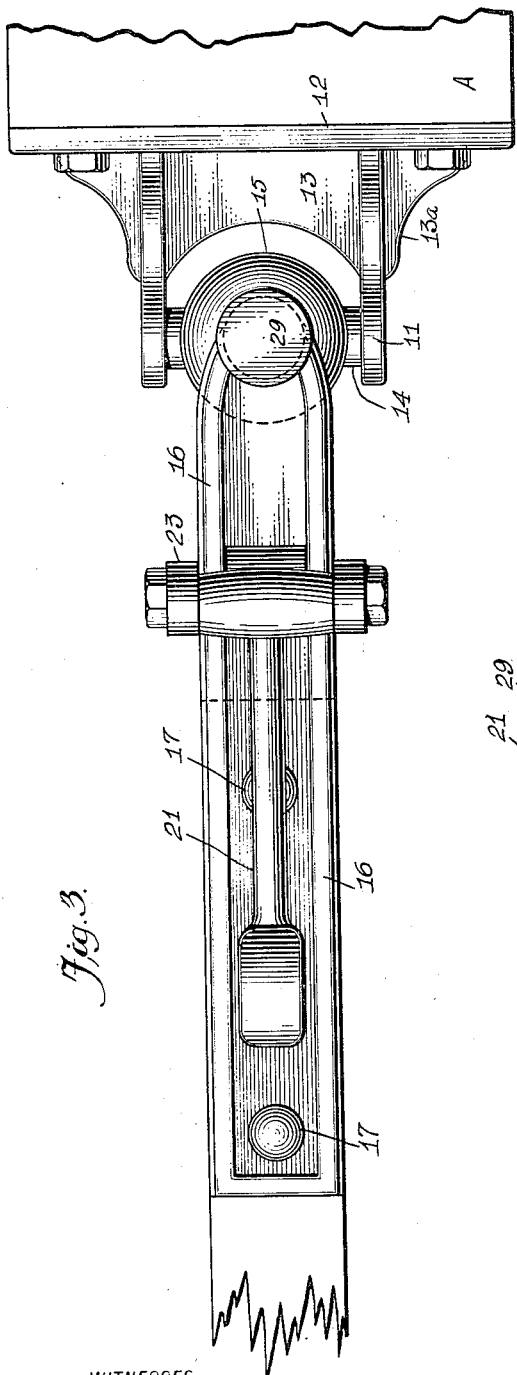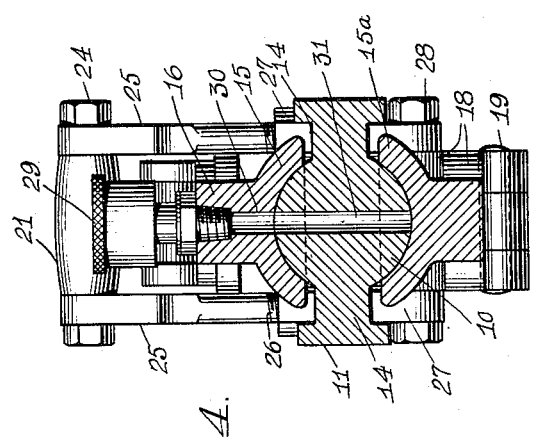

JACOB W. BULLER, OF HILLSBORO, KANSAS, ASSIGNOR TO BULLER COUPLER CO., OF HILLSBORO, KANSAS, A CORPORATION OF WISCONSIN.

TRUCK AND TRAILER COUPLING.

1,401,873.  Specification of Letters Patent.  Patented Dec. 27, 1921.

Application filed September 17, 1920. Serial No. 410,924.

*To all whom it may concern:*

Be it known that I, JACOB W. BULLER, a citizen of the United States, and a resident of Hillsboro, in the county of Marion and State of Kansas, have invented a new and Improved Truck and Trailer Coupling, of which the following is a full, clear, and exact description.

My invention relates to means for coupling a trailer to a truck or other vehicle, and more particularly relates to a coupler having mating coupling elements adapted to be secured respectively to the truck and to the tongue of the trailer or vehicle to be hauled.

The general object of my invention is to provide a coupler of the indicated character and of the ball and socket type, the socket being composed of members, one movable relatively to the other, for quickly coupling or uncoupling.

A further object of the invention is to provide means for operating the movable socket member said means being adjustable to insure the proper relation between the socket members and the ball.

The invention also has for an important object to provide novel lubricating means for the ball and socket and especially coördinated with the fixed and movable socket members so that not only will the ball be lubricated at its contact with the upper socket member, but is so arranged that the oil will pass through the ball to the lower socket member when the latter is in coupling position.

Reference is to be had to the accompanying drawing, it being understood that the drawing is merely illustrative of one example of the invention.

Figure 1 is a side elevation of a truck and trailer coupler embodying my invention, parts being broken away, the coupling elements being in coupled position.

Fig. 2 is a view similar to Fig. 1, but with the coupling elements in uncoupled position.

Fig. 3 is a plan view; and

Fig. 4 is a cross section on the line 4—4 of Fig. 1.

In carrying out my invention in accordance with the illustrated example a coupling element 10 is provided preferably in the form of a ball shaped head adapted to be secured to a truck or other hauling vehicle, a portion of which is conveniently indicated at A; said ball head in the present example is rigid with bracket arms 11 which are formed integral with a base 12 adapted to be bolted to the truck A. The ball 10 is here shown as having integral lateral members 14 at the side which are rigid with the bracket arm 11. The bracket arms 11 may, as shown, be strengthened by integral webs 13 therebetween, and outer web members 13$^a$.

The socket portion of my improved coupler includes a relatively fixed socket member 15 of shallow cup form, at the top, and a relatively movable coupling member 15$^a$ at the bottom adapted to engage the ball 10 at the bottom. The upper rigid socket member 15 is formed upon or secured to the outer end of a plate 16 adapted to be secured by bolts 17 or the like, to the tongue B of the trailer or the vehicle to be hauled. The movable socket member 15$^a$ is formed upon or secured to the front end of an arm 18 hinged at its rear end, as at 19, to the front end of a plate 20 adapted to be secured to the tongue B at the under side thereof by the bolts 17. The arrangement is such that the socket member may be swung vertically with the hinge 19 as a center toward or from the plane of the upper socket member 15.

In order to operate the swingable arm 18 in coupling and uncoupling I provide a bell crank lever 21 fulcrumed at the angle thereon, as by bolt or pin 22, to vertical side ears 23 on the plate 16. To the short arm of said bell crank lever is pivotally secured by a bolt 24 the upper ends of side links 25 formed of longitudinally adjustable sections, the lower ends of said links being secured by bolts 28 to the swingable arm 18. The upper section of each link 25 has its lower end reduced and threaded at 26, having threaded engagement with the lower socket section 27 of each link, said socket section receiving bolt 28. Thus with bolt 24 or bolt 28 removed the links 25 may be shortened or lengthened to cause the socket members 15, 15$^a$, to have proper relation to each other for the proper engagement with the ball 10. In the coupled position of the socket member 15$^a$, the lever 21 will lie close against the top of plate 16, as shown in Fig. 1. In order to uncouple it will be necessary only to swing the lever upwardly, thereby causing the links 25 to move downwardly and the hinged arm 18 to have a corresponding movement for withdrawing the lower socket member 15$^a$ from beneath the ball 10, permitting the latter to readily uncouple. It will be observed by comparison of Figs. 1 and 2, that in the coupling movement of the lever 21 the pivot bolt 24 connecting the links 25 with said lever will be carried across the fulcrum 22 of the lever, and therefore pass the dead center for locking the socket member 15ª in the coupled position, thereby preventing accidental uncoupling.

For lubricating the ball and socket I provide an oil cup 29 secured to the plate 16, above the coupling member 15, said oil cup delivering to a vertical oil passage 30 extending through said plate 16 and said socket member 15, to the face of said member and therefore to the top of the ball 10. A vertical oil passage 31 extends through the ball 10, its upper end communicating with the oil passage 30 to receive a supply of oil from the latter whereby the oil is conducted through the ball to the under side thereof and to the opposed face of the lower coupling member 15ª. Thus when the ball 10 is coupled the oil cup 29 will supply lubricant to both the upper fixed coupling member 15 and to the swingable coupling member 15ª.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

I claim:

1. A coupling of the class described, including a head constituting one coupling element, a bracket adapted at an end thereof to be secured to a vehicle, said bracket having integral members extending laterally inward therefrom to a connection with said head at both sides of the latter, and a mating socket for said head composed of members one of which is mounted for movement toward or from the plane of the other for coupling or uncoupling, the lateral bracket members at the sides of the head being accommodated between said socket members.

2. A coupling of the class described, including a head constituting one coupling element, a bracket adapted at an end thereof to be secured to a vehicle, said bracket having integral members extending laterally inward therefrom to a connection with said head at both sides of the latter, and a mating socket for said head composed of members one of which is mounted for movement toward or from the plane of the other for coupling or uncoupling, the lateral bracket members at the sides of the head being accommodated between said socket members, together with means to manually operate the movable coupling member.

3. A coupling of the class described including a coupling head, a bracket adapted to be secured to a vehicle, and a mating socket for said head having members adapted to engage the head at the top and bottom, swingable means carrying one of said socket members, and means to manually operate said swingable means, said bracket having integral members extending laterally inward therefrom between the socket members at diametrically opposite sides of the head and rigid with the latter.

4. A coupling of the class described including a coupling head, and upper and lower socket members for said head, the upper member having an oil passage and said head having an oil passage leading through the same from the top thereof to the under side for lubricating the lower socket member.

5. A coupling of the class described including a coupling head, and upper and lower socket members for said head, the upper member having an oil passage and said head having an oil passage leading through the same from the top thereof to the under side for lubricating the lower socket member; together with an oil cup discharging to the oil passage of the upper socket member.

JACOB W. BULLER.